United States Patent
Basu Mallick et al.

(10) Patent No.: US 11,968,733 B2
(45) Date of Patent: Apr. 23, 2024

(54) PROVIDING A RADIO LINK FAILURE INDICATION

(71) Applicant: Lenovo (Singapore) PTE. LTD., New Tech Park (SG)

(72) Inventors: Prateek Basu Mallick, Dreieich (DE); Karthikeyan Ganesan, Kaiserslautern (DE); Joachim Loehr, Wiesbaden (DE); Ravi Kuchibhotla, Chicago, IL (US); Alexander Johann Maria Golitschek Edler von Elbwart, Darmstadt (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 16/908,454

(22) Filed: Jun. 22, 2020

(65) Prior Publication Data
US 2021/0092789 A1 Mar. 25, 2021

Related U.S. Application Data

(60) Provisional application No. 62/902,773, filed on Sep. 19, 2019.

(51) Int. Cl.
*H04W 76/18* (2018.01)
*H04W 24/04* (2009.01)
*H04W 76/19* (2018.01)

(52) U.S. Cl.
CPC ........... *H04W 76/18* (2018.02); *H04W 24/04* (2013.01); *H04W 76/19* (2018.02)

(58) Field of Classification Search
CPC ..... H04W 76/18; H04W 24/04; H04W 76/19; H04W 72/569; H04W 40/02; H04B 17/382; H04L 1/188; H04L 5/0048
See application file for complete search history.

(56) References Cited

U.S. PATENT DOCUMENTS

2015/0334757 A1* 11/2015 Seo .................. H04W 76/14 370/329
2019/0254042 A1* 8/2019 Cirik .................. H04L 5/0048
(Continued)

FOREIGN PATENT DOCUMENTS

CA 2374199 C * 12/2011 ........... H04B 17/382
WO 2019030163 A1 2/2019

OTHER PUBLICATIONS

PCT/IB2020/000564, "Notification of Transmittal of the International Search Report and the Written Opinion of the International Searching Authority, or the Declaration", ISA, dated Oct. 9, 2020, pp. 1-12.
(Continued)

*Primary Examiner* — Huy D Vu
*Assistant Examiner* — Robert Ma
(74) *Attorney, Agent, or Firm* — Kunzler Bean & Adamson

(57) ABSTRACT

Apparatuses, methods, and systems are disclosed for providing a radio link failure indication. One method includes counting a number of consecutive discontinuous indications. The method includes comparing the number of consecutive discontinuous indications to a predetermined threshold. The method includes, in response to the number of consecutive discontinuous indications being greater than the predetermined threshold, providing a radio link failure indication.

20 Claims, 5 Drawing Sheets

(56) References Cited

U.S. PATENT DOCUMENTS

| | | | |
|---|---|---|---|
| 2020/0106700 A1* | 4/2020 | Jo | H04W 40/02 |
| 2020/0245188 A1* | 7/2020 | Zhang | H04W 72/569 |
| 2021/0068189 A1* | 3/2021 | Hahn | H04L 1/188 |
| 2021/0297199 A1* | 9/2021 | Miao | H04L 1/1896 |

OTHER PUBLICATIONS

Huawei, Hisilicon, Link recovery procedure for beam failure, 3GPP TSG RAN WG1 Meeting #88b R1-1704230, Apr. 3-7, 2017, pp. 1-7.

3GPP, RLM and RLF in HF NR, 3GPP TSG RAN WG2 Meeting #95 R2-164899, Aug. 22-26, 2016, pp. 1-4.

Mediatek Inc., RLM and RLF in HF NR, 3GPP TSG-RAN WG2 Meeting 97bis R2-1702770, Apr. 3-7, 2017, pp. 1-5.

Ericsson, Beam recovery impact to RLF triggering, 3GPP TSG-RAN WG2 NR #101bis Tdoc R2-1805380, Apr. 16-20, 2018, pp. 1-4.

3GPP, "3rd Generation Partnership Project; Technical Specification Group Radio Access Network; Evolved Universal Terrestrial Radio Access (E-UTRA); Physical layer procedures (Release 15)", 3GPP TS 36.213 V15.6.0, Jun. 2019, pp. 1-551.

3GPP, "3rd Generation Partnership Project; Technical Specification Group Radio Access Network; NR; Radio Resource Control (RRC) protocol specification (Release 15)", 3GPP TS 38.331 V15.6.0, Jun. 2019, pp. 1-519.

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.6.0, Jun. 2019, pp. 1-960.

* cited by examiner

PROVIDING A RADIO LINK FAILURE INDICATION

CROSS-REFERENCE TO RELATED APPLICATIONS

This application claims priority to U.S. Patent Application Ser. No. 62/902,773 entitled "APPARATUSES, METHODS, AND SYSTEMS FOR RADIO LINK MONITORING IN NR V2X COMMUNICATION" and filed on Sep. 19, 2019 for Prateek Basu Mallick, which is incorporated herein by reference in its entirety.

FIELD

The subject matter disclosed herein relates generally to wireless communications and more particularly relates to providing a radio link failure indication.

BACKGROUND

The following abbreviations are herewith defined, at least some of which are referred to within the following description: Third Generation Partnership Project ("3GPP"), 5$^{th}$ Generation ("5G"), QoS for NR V2X Communication ("5QI/PQI"), Authentication, Authorization, and Accounting ("AAA"), Positive-Acknowledgment ("ACK"), Application Function ("AF"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Application Server ("AS"), Application Service Provider ("ASP"), Autonomous Uplink ("AUL"), Authentication Server Function ("AUSF"), Authentication Token ("AUTN"), Background Data ("BD"), Background Data Transfer ("BDT"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Channel Access Priority Class ("CAPC"), Channel Busy Percentage ("CBP"), Channel Busy Ratio ("CBR"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Configured Grant ("CG"), Closed-Loop ("CL"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink Feedback Information ("DFI"), Downlink ("DL"), Demodulation Reference Signal ("DMRS"), Data Network Name ("DNN"), Data Radio Bearer ("DRB"), Discontinuous Reception ("DRX"), Dedicated Short-Range Communications ("DSRC"), Downlink Pilot Time Slot ("DwPTS"), Enhanced Clear Channel Assessment ("eCCA"), Enhanced Mobile Broadband ("eMBB"), Evolved Node B ("eNB"), Extensible Authentication Protocol ("EAP"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1—sub 6 GHz frequency bands and/or 410 MHz to 7125 MHz ("FR1"), Frequency Range 2—24.25 GHz to 52.6 GHz ("FR2"), Universal Geographical Area Description ("GAD"), Guaranteed Bit Rate ("GBR"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), General Public Subscription Identifier ("GPSI"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), In Sync ("IS"), Key Management Function ("KMF"), Layer 1 ("L1"), Layer 2 ("L2"), Layer 3 ("L3"), Licensed Assisted Access ("LAA"), Local Area Data Network ("LADN"), Local Area Network ("LAN"), Load Based Equipment ("LBE"), Listen-Before-Talk ("LBT"), Logical Channel ("LCH"), Logical Channel Group ("LCG"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Maximum Bit Rate ("MBR"), Minimum Communication Range ("MCR"), Modulation Coding Scheme ("MCS"), Master Information Block ("MIB"), Multimedia Internet Keying ("MIKEY"), Multiple Input Multiple Output ("MIMO"), Mobility Management ("MM"), Mobility Management Entity ("MME"), Mobile Network Operator ("MNO"), Mobile Originated ("MO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), New Data Indicator ("NDP"), Network Entity ("NE"), Network Exposure Function ("NEF"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NS SF"), Network Slice Selection Policy ("NS SP"), Operation, Administration, and Maintenance System or Operation and Maintenance Center ("OAM"), Orthogonal Frequency Division Multiplexing ("OFDM"), Open-Loop ("OL"), Out of Sync ("OOS"), Other System Information ("OSI"), Power Angular Spectrum ("PAS"), Physical Broadcast Channel ("PBCH"), Power Control ("PC"), UE to UE interface ("PC5"), Policy and Charging Control ("PCC"), Primary Cell ("PCell"), Policy Control Function ("PCF"), Physical Cell Identity ("PCP"), Packet Delay Budget ("PDB"), Physical Downlink Control Channel ("PDCCH"), Packet Data Convergence Protocol ("PDCP"), Interface for Direct UE to UE Communication ("PC5"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), PC5 QoS Class Identifier ("PQI"), Physical Random Access Channel ("PRACH"), Physical Resource Block ("PRB"), Proximity Services ("ProSe"), Positioning Reference Signal ("PRS"), Physical Sidelink Control Channel ("PSCCH"), Primary Secondary Cell ("PSCell"), Physical Sidelink Feedback Control Channel ("PSFCH"), Physical Uplink Control Channel ("PUCCH"), Physical Uplink Shared Channel ("PUSCH"), QoS Class Identifier ("QCI"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Serving RAT ("RAT-1") (serving with respect to Uu), Other RAT ("RAT-2") (non-serving with respect to Uu), Random Access Procedure ("RACH"), Random Access Preamble Identifier ("RAPID"), Random Access Response ("RAR"), Resource Block Assignment ("RBA"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Unit ("SDU"), Security Anchor Function ("SEAF"), Sidelink Feedback Content Information ("SFCI"), Serving Gateway ("SGW"), System Information Block ("SIB"), SystemInformationBlockType1 ("SIB1"), SystemInformationBlockType2 ("SIB2"), Sub scriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management ("SM"), Session Management Function ("SMF"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TM"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Interface Between a UE and a RAN ("Uu interface"), Vehicle-to-Vehicle ("V2V"), Vehicle-to-Anything ("V2X"), V2X UE (e.g., a UE capable of vehicular communication using 3GPP protocols), Visiting AMF ("vAMF"), V2X Encryption Key ("VEK"), V2X Group Key ("VGK"), V2X MIKEY Key ("VMK"), Visiting NSSF ("vNSSF"), Visiting PLMN ("VPLMN"), V2X Traffic Key ("VTK"), Wide Area Network ("WAN"), and Worldwide Interoperability for Microwave Access ("WiMAX").

In certain wireless communications networks, radio link failures may occur.

BRIEF SUMMARY

Methods for providing a radio link failure indication are disclosed. Apparatuses and systems also perform the functions of the methods. One embodiment of a method includes counting a number of consecutive discontinuous indications. In some embodiments, the method includes comparing the number of consecutive discontinuous indications to a predetermined threshold. In certain embodiments, the method includes, in response to the number of consecutive discontinuous indications being greater than the predetermined threshold, providing a radio link failure indication.

One apparatus for providing a radio link failure indication includes a processor that: counts a number of consecutive discontinuous indications; and compares the number of consecutive discontinuous indications to a predetermined threshold. In various embodiments, the apparatus includes a transmitter that, in response to the number of consecutive discontinuous indications being greater than the predetermined threshold, provides a radio link failure indication.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
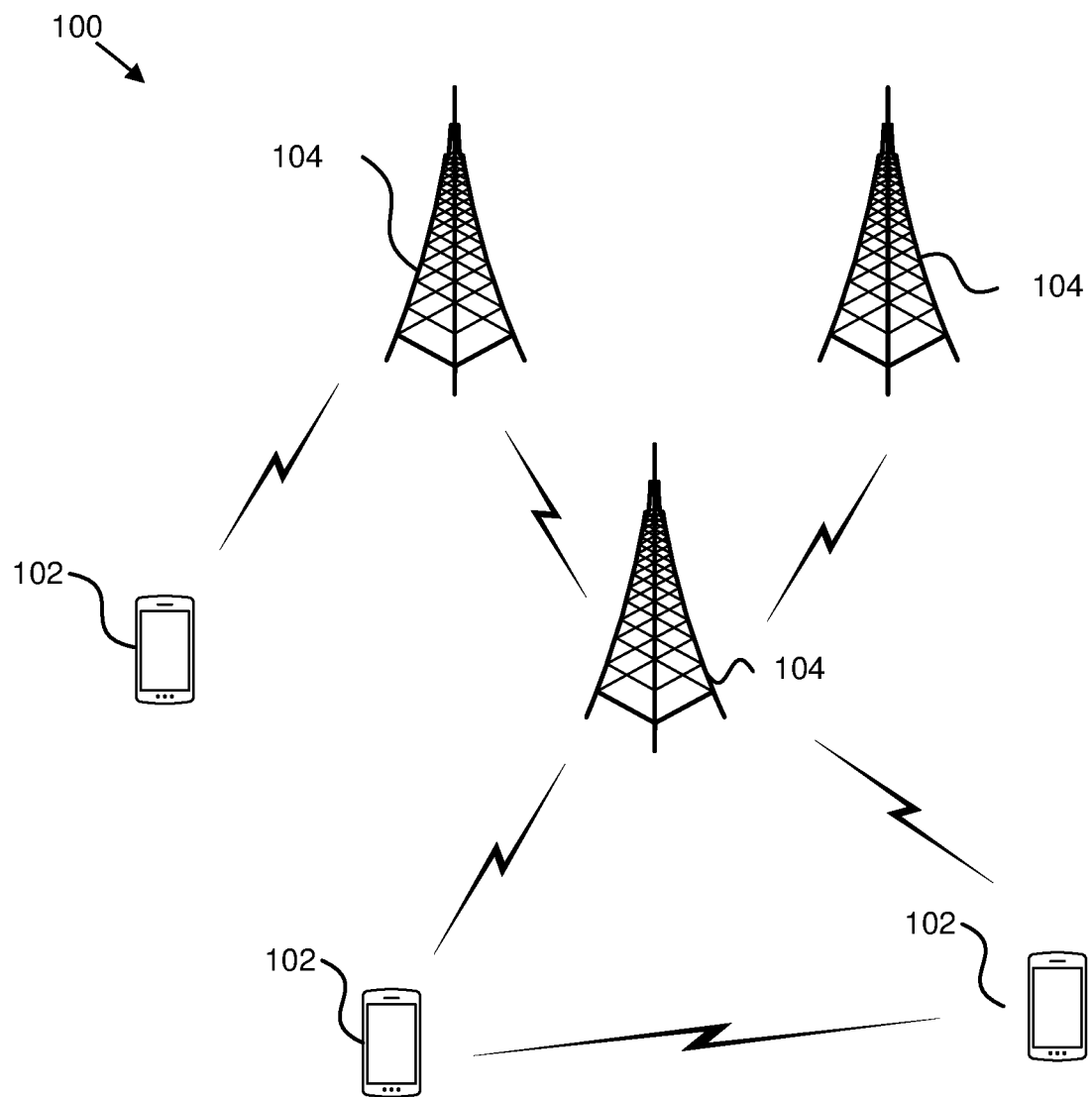
FIG. 1 is a schematic block diagram illustrating one embodiment of a wireless communication system for providing a radio link failure indication.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for providing a radio link failure indication. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, an AS, an NEF, a key management server, a KMF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may count a number of consecutive discontinuous indications. In some embodiments, the remote unit 102 may compare the number of consecutive discontinuous indications to a predetermined threshold. In certain embodiments, the remote unit 102 may, in response to the number of consecutive discontinuous indications being greater than the predetermined threshold, provide a radio link failure indication. Accordingly, the remote unit 102 may be used for providing a radio link failure indication.

Figure 2:
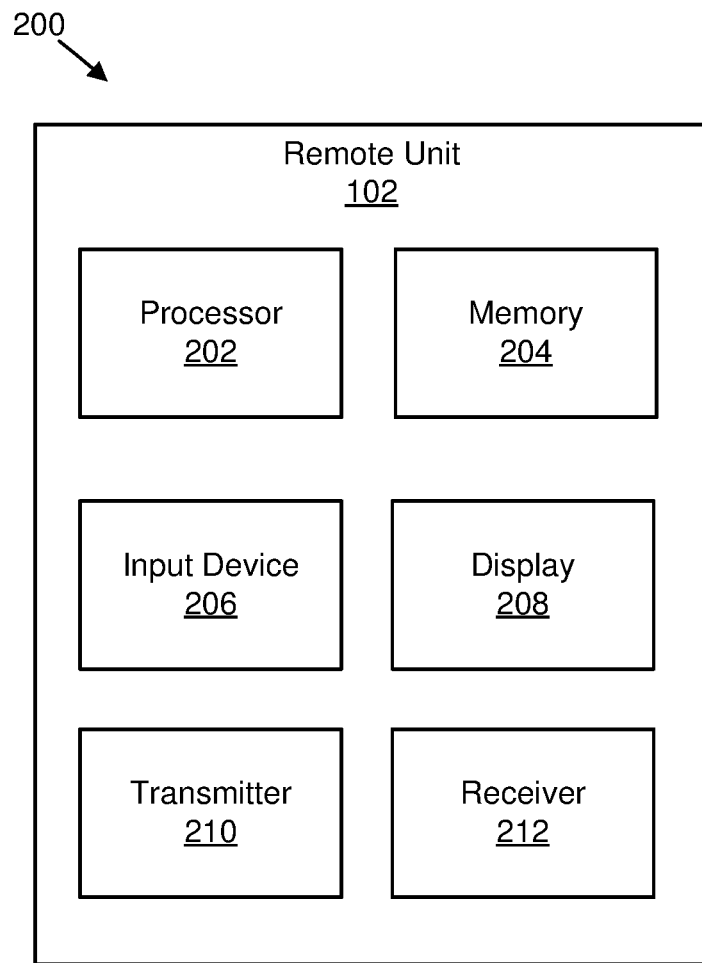
FIG. 2 is a schematic block diagram illustrating one embodiment of an apparatus that may be used for providing a radio link failure indication.

FIG. 2 depicts one embodiment of an apparatus 200 that may be used for providing a radio link failure indication. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the processor 202 may: count a number of consecutive discontinuous indications; and compare the number of consecutive discontinuous indications to a predetermined threshold. In some embodiments, the transmitter 210 may, in response to the number of consecutive discontinuous indications being greater than the predetermined threshold, provide a radio link failure indication.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
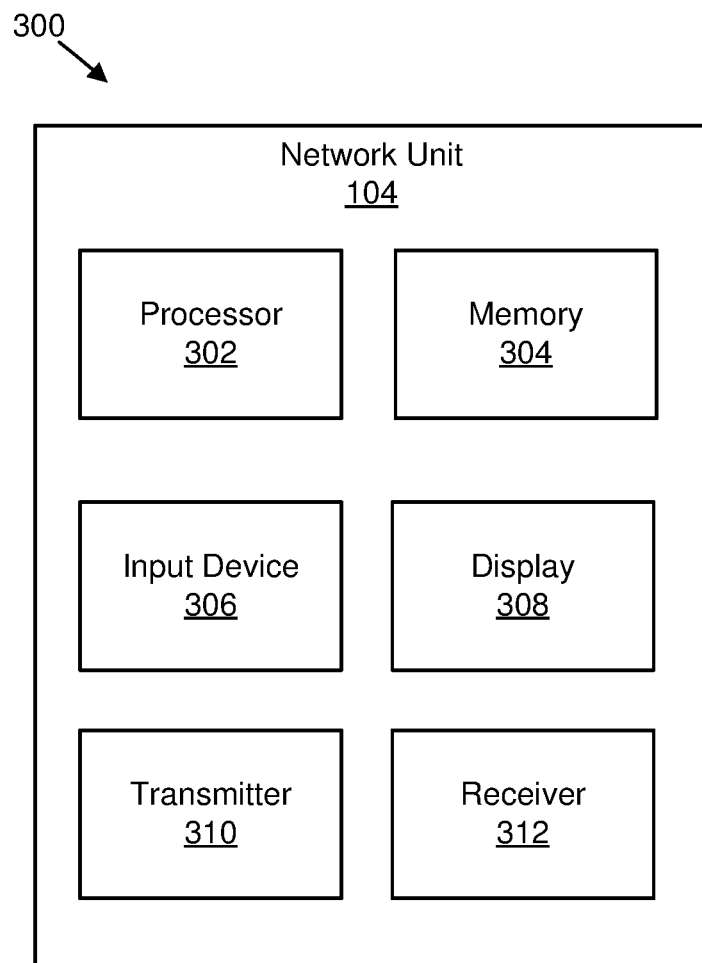
FIG. 3 is a schematic block diagram illustrating one embodiment of an apparatus that may be used for providing a radio link failure indication.

FIG. 3 depicts one embodiment of an apparatus 300 that may be used for providing a radio link failure indication. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310 may be used for transmitting information described herein and/or the receiver 312 may be used for receiving information described herein.

In various embodiments, RLM of a Uu interface may be performed. In such embodiments, if the RLM procedure indicates that the UE is out of sync with respect to the Uu DL interface (e.g., a hypothetical BLER target for PDCCH exceeds a certain percentage such as 10%) consistently for a time duration, a UE may declare a RLF and initiate an appropriate recovery procedure. In some embodiments, the recovery on a Uu interface includes trying to re-establish an RRC connection on a different cell. In certain embodiments, in PC5 it may be meaningful to perform radio link monitoring to determine if the radio link between two UEs is sufficiently good and, if not, the UEs may not unnecessarily attempt another transmission to other UEs. In various embodiments, after having declared RLF, a UE may immediately or shortly later clear the context for another UE and free memory space.

In some embodiments, there may be no RLM RS defined and, in the absence of an RLM RS, it may not be possible to estimate and track a link quality.

In certain embodiments, HARQ feedback may be used as a replacement for a RLM RS and an amount of ACK and NACK feedbacks may be used to determine if a radio link is good enough. However, in such embodiments, HARQ feedback may be received only in response to a data transmission by a transmitter. Moreover, in such embodiments, in the absence of application layer data, it may not be clear how the HARQ feedback may be used for radio link monitoring.

In various embodiments, "Keep Alive" messages may not be sent from an L2 and/or L3 protocol layer. In some embodiments, RS may not be transmitted in a periodic manner only for SL RLM purposes. In such embodiments, link quality between 2 UEs may be monitored using other means such as by taking HARQ feedback, channel busyness, and/or RSSI measurements into account.

In certain embodiments, a UE (e.g., MAC of a UE) may indicate with an indicator sent to a UE PHY that no more data is available for a particular destination if RLC and/or PDCP buffers for the particular destination is empty. The indicator may be sent as a separate indication (e.g., inter layer communication) from the MAC to the PHY and/or if submitting a last PDU for a particular destination to the PHY. In such embodiments, in response to knowing that no more data for a particular destination is available in L2 upper layers (e.g., via the indicator), the PHY may keep retransmitting a last data packet (e.g., TB) until a predetermined timer expires, or until new data becomes available for transmission. The predetermined timer may be a single radio link monitoring timer for a destination UE and/or may be started (or restarted) by the transmitter upon receiving feedback from the destination UE. The destination UE may be identified using one or more of: an L2 destination ID; an application layer identifier; and/or a link identifier between a source and destination UE (e.g., a PC5 RNTI or a layer-1 identified). In some embodiments, in response to PDB being exceeded corresponding to a last transmission towards the destination, and there is no further (e.g., new and/or not yet transmitted) data available for transmission, a time interval to a next retransmission may be T1 (e.g., from a last transmission before PDB expiry), T2 from the first retransmission after PDB expiry, T3 from the second retransmission after PDB expiry, and so forth. Accordingly, T1<=T2<=T3<=T4 and so forth. The time intervals may be in milliseconds and/or may be in a number of NR slots for a corresponding numerology in use. In deciding the value for T1, T2, T3, and so forth, a relative speed (e.g., Doppler spread) of the 2 UEs in communication and/or inter packet transmission time may be taken into account.

Figure 4:
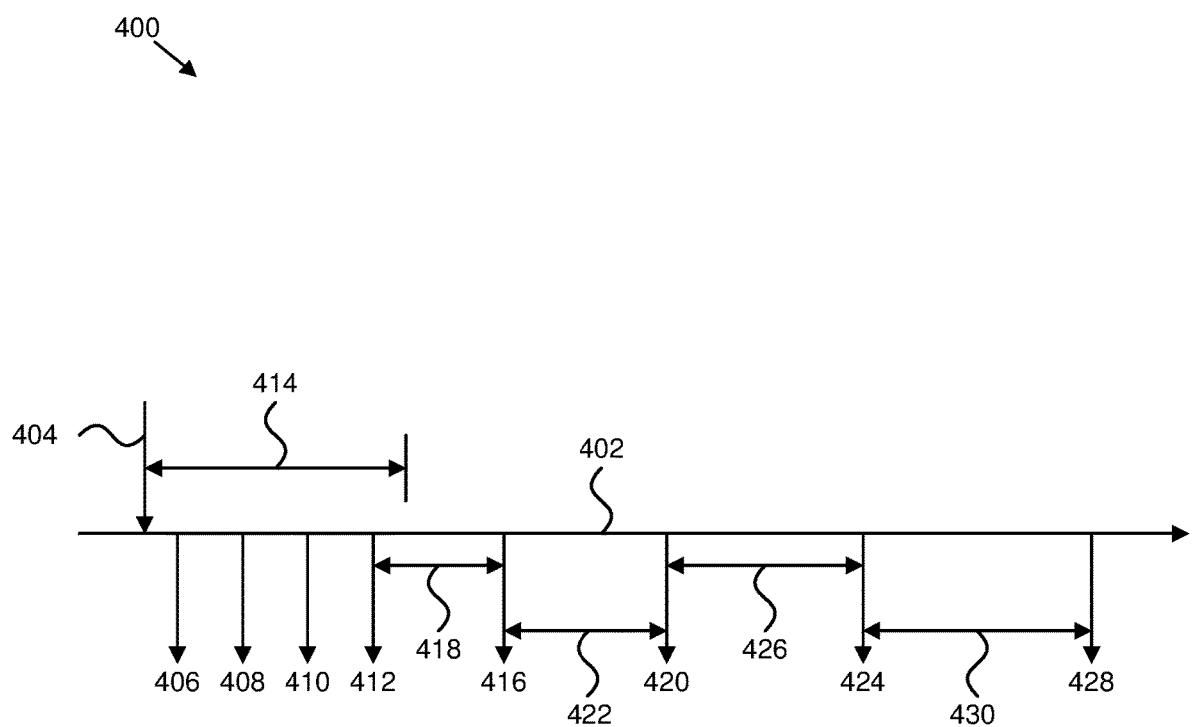
FIG. 4 is a timing diagram illustrating one embodiment of transmissions relative to a PDB.

FIG. 4 is a timing diagram illustrating one embodiment of transmissions 400 relative to a PDB over a time 402. The transmission 400 include a packet arrival 402 and regular transmissions 406, 408, 410, and 412 within a PDB time period 414. A first retransmission 416 may be a first time period ("T1") 418 after the last regular transmission 412. Further, a second retransmission 420 may be a second time period ("T2") 422 after the first retransmission 416. Moreover, a third retransmission 424 may be a third time period ("T3") 426 after the second retransmission 420. A fourth retransmission 428 may be a fourth time period ("T4") 430 after the third retransmission 424.

In certain embodiments, an OOS indication may be sent to an upper layer (e.g., RRC or MAC) by a PHY upon a timer's expiration. In such embodiments, or in another embodiment, the PHY may count a number of contiguously received NACK feedbacks (e.g., no ACK feedback in between) and, if the number of contiguous received NACK feedbacks exceed a predetermined threshold within a time window $T_w$, an OOS indication may be sent to an upper layer. In some embodiments, a number of occasions with "no feedback" (e.g., neither ACK nor NACK) is counted together with contiguous received NACK feedbacks and compared against a predetermined threshold.

In various embodiments, PHY sends IS indications to an upper layer upon receiving one or more positive feedback indications (e.g., ACK) from an intended receiver.

In certain embodiments, an upper layer runs a timer upon receiving one or more OOS indications from PHY and if no (or less than a predetermined threshold) IS indication is received from PHY before the timer expires, an RLF is detected. In some embodiments, upon indicating OOS to an upper layer, a timer is restarted and PHY continues with a transmission or retransmission.

In various embodiments, a detected RLF may be declared by a UE upon a first time (or a predetermined number of times) that the timer expires.

In certain embodiment, PHY signals OOS and optionally IS to an upper layer. In such embodiments, the upper layer may start a timer (e.g., upper layer timer) if an OOS is received and may increment a local counter. If the value of the local counter reaches a threshold value, RLF may be declared. The local counter may be reset to 0 every time the timer expires and/or if one or more IS indication is received.

In some embodiments, a MAC entity may keep submitting TBs at different intervals to PHY. If there is no upper layer data (e.g., RLC PDUs) for a destination UE, the MAC may generate a padding MAC TB. The different intervals may be T1, T2, T3, and so forth as described herein in other embodiments such that T1<=T2<=T3<=T4 and so forth. T1 may be applied after a last regular transmission (or retransmission) of a TB.

In various embodiments, instead of a padding BSR (or padding MAC TB), information may be signaled using RRC or MAC signaling. The information may be used to indicate how long a TX UE is to keep monitoring a link. In such embodiments, a receiver may determine if it wants to keep the link alive by sending data or HARQ feedbacks for received data and/or may signal back to a transmitter directly using appropriate RRC or MAC signaling about how long (e.g., in milliseconds) to still keep the link alive. The link may be kept alive with or without sending padding BSR and/or RRC or MAC signaling.

In certain embodiments, such as for embodiments using a padding BSR, RRC signaling, or MAC signaling, a PDB, priority, TB size, MCS, and so forth may be specified, configured, or preconfigured so that it does not take precedence over other traffic, should not use too many resources (e.g., by having a low priority, MCS, TB size, and so forth), and so forth.

In various embodiments, a PHY may be expected to determine IS and OOS and signal the IS and OOS determinations to upper layers (e.g., RRC or MAC). In some embodiments, an RLF determination procedure may be performed at a RRC, or may be performed using any embodiment described herein.

In certain embodiments, instead of HARQ feedback, CBR or CBP measurements may be used. Accordingly, any embodiment described herein that references HARQ feedback may instead use CBR and/or CBP. Therefore, an action may be performed in response to a CBR and/or a CBP being greater than and/or less than a predetermined threshold.

In various embodiments, if CBR>a threshold CBR, then a UE may tear down RBs and/or QoS flows with priority less than a threshold priority or may perform carrier selection (or reselection).

In some embodiments, RLM OOS or RLF may be declared based on a failure to find resources successfully based on a sensing operation. In such embodiments, the failure to find sufficient resources with an RSRP<a threshold RSRP in a predetermined time. The threshold RSRP may be chosen based on a PQI. In certain embodiments, if a number of preempted packets, as part of a sensing based resource selection procedure, exceeds a predetermined number then a channel may be considered busy, RLM OOS may be declared, RLF may be declared, and/or carrier selection (or reselection) may be performed.

In various embodiments, RLM may be linked to PQI or may be configurable per LCH configuration (e.g., QoS flows and/or which logical channels are enabled to initiate RLM and/or RLF). In some embodiments, if data characteristics like priority and/or configuration do not necessitate that a link be monitored, then the link may be terminated after an inactivity period specified, configured, or preconfigured (e.g., T milliseconds).

As may be appreciated, values for all timers, timer periods, and thresholds (e.g., signal quality related, priority, or otherwise) described herein may be specified, configured, preconfigured, or determined by UE implementation.

Figure 5:
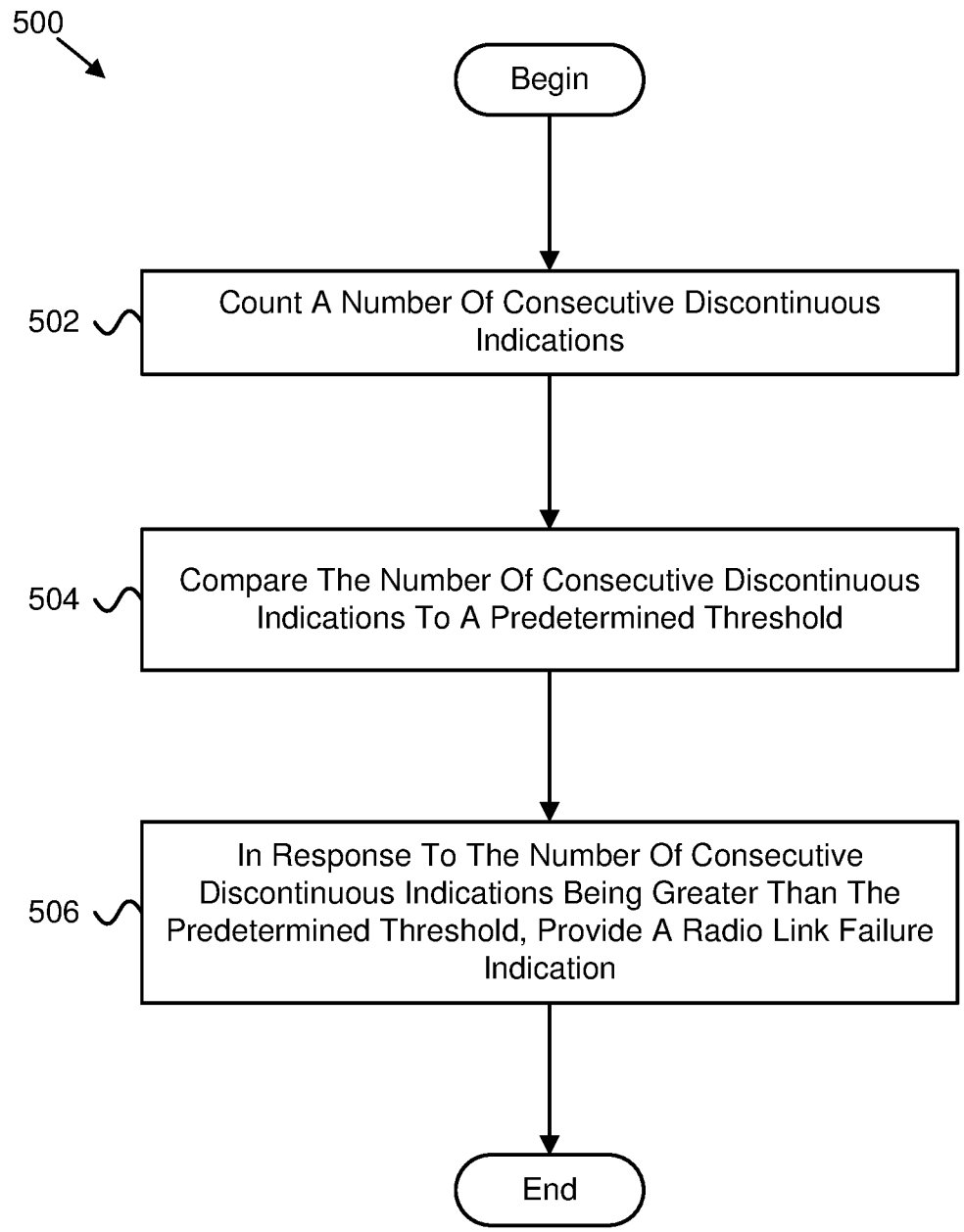
FIG. 5 is a flow chart diagram illustrating one embodiment of a method for providing a radio link failure indication.

FIG. 5 is a flow chart diagram illustrating one embodiment of a method 500 for providing a radio link failure indication. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

In various embodiments, the method 500 includes counting 502 a number of consecutive discontinuous indications. Consecutive discontinuous indications may mean that no ACK and no NACK is received for each consecutive indication (e.g., no feedback reception is one discontinuous reception). In some embodiments, the method 500 includes comparing 504 the number of consecutive discontinuous indications to a predetermined threshold. In certain embodiments, the method 500 includes, in response to the number of consecutive discontinuous indications being greater than the predetermined threshold, providing 506 a radio link failure indication.

In certain embodiments, the method 500 further comprises providing an indication that there is no data available for a transmission to a destination user equipment. In some embodiments, the indication is provided in response to buffers corresponding to the destination user equipment being empty. In various embodiments, the indication is transmitted from a medium access control layer to a physical layer, and the indication is separate from other data.

In one embodiment, the indication is transmitted to a physical layer together with a last protocol data unit for the destination user equipment. In certain embodiments, the method 500 further comprises, in response to the indication, retransmitting a last transmitted data packet to the destination user equipment for a predetermined duration or until data becomes available for transmission to the destination user equipment. In some embodiments, the predetermined duration is set by a radio link monitoring timer.

In various embodiments, the predetermined duration is restarted in response to receiving feedback from the destination user equipment, and the feedback corresponds to the retransmission of the last transmitted data packet. In one embodiment, a time between retransmissions of the last transmitted data packet increases after each retransmission. In certain embodiments, a first number of retransmissions are made with a first periodicity and a second number of retransmissions are made with a second periodicity greater than the first periodicity.

In some embodiments, the destination user equipment is identified using a layer 2 destination identifier, an application layer identifier, a link identifier, or some combination thereof. In various embodiments, providing the radio link failure indication comprises a physical layer transmitting an out of sync indication to an upper layer, and the upper layer comprises a radio resource control layer or a medium access control layer. In one embodiment, the upper layer counts a number of out of sync indications received, and determines to provide the radio link failure indication in response to the number reaching a predetermined out of sync threshold.

In certain embodiments, the upper layer starts a timer in response to receiving a first out of sync indication, and the upper layer resets the number in response to the timer expiring before the number reaches the predetermined out of sync threshold or in response to receiving an in sync indication. In some embodiments, the method 500 further comprises providing a padding medium access control transport block from a medium access control layer to a physical layer for transmission if there is no data available for transmission. In various embodiments, the padding medium access control transport block is provided to the physical layer at a time interval that increases after each transmission.

In one embodiment, the padding medium access control transport block is configured with a specific priority, a small transport block size, a particular modulation and coding scheme, or some combination thereof. In certain embodiments, the method 500 further comprises providing an informational medium access control transport block from a medium access control layer to a physical layer for transmission if there is no data available for transmission.

In one embodiment, a method comprises: counting a number of consecutive discontinuous indications; comparing the number of consecutive discontinuous indications to a predetermined threshold; and, in response to the number of consecutive discontinuous indications being greater than the predetermined threshold, providing a radio link failure indication.

In certain embodiments, the method further comprises providing an indication that there is no data available for a transmission to a destination user equipment.

In some embodiments, the indication is provided in response to buffers corresponding to the destination user equipment being empty.

In various embodiments, the indication is transmitted from a medium access control layer to a physical layer, and the indication is separate from other data.

In one embodiment, the indication is transmitted to a physical layer together with a last protocol data unit for the destination user equipment.

In certain embodiments, the method further comprises, in response to the indication, retransmitting a last transmitted data packet to the destination user equipment for a predetermined duration or until data becomes available for transmission to the destination user equipment.

In some embodiments, the predetermined duration is set by a radio link monitoring timer.

In various embodiments, the predetermined duration is restarted in response to receiving feedback from the destination user equipment, and the feedback corresponds to the retransmission of the last transmitted data packet.

In one embodiment, a time between retransmissions of the last transmitted data packet increases after each retransmission.

In certain embodiments, a first number of retransmissions are made with a first periodicity and a second number of retransmissions are made with a second periodicity greater than the first periodicity.

In some embodiments, the destination user equipment is identified using a layer 2 destination identifier, an application layer identifier, a link identifier, or some combination thereof.

In various embodiments, providing the radio link failure indication comprises a physical layer transmitting an out of sync indication to an upper layer, and the upper layer comprises a radio resource control layer or a medium access control layer.

In one embodiment, the upper layer counts a number of out of sync indications received, and determines to provide the radio link failure indication in response to the number reaching a predetermined out of sync threshold.

In certain embodiments, the upper layer starts a timer in response to receiving a first out of sync indication, and the upper layer resets the number in response to the timer expiring before the number reaches the predetermined out of sync threshold or in response to receiving an in sync indication.

In some embodiments, the method further comprises providing a padding medium access control transport block from a medium access control layer to a physical layer for transmission if there is no data available for transmission.

In various embodiments, the padding medium access control transport block is provided to the physical layer at a time interval that increases after each transmission.

In one embodiment, the padding medium access control transport block is configured with a specific priority, a small transport block size, a particular modulation and coding scheme, or some combination thereof.

In certain embodiments, the method further comprises providing an informational medium access control transport block from a medium access control layer to a physical layer for transmission if there is no data available for transmission.

In one embodiment, an apparatus comprises: a processor that: counts a number of consecutive discontinuous indications; and compares the number of consecutive discontinuous indications to a predetermined threshold; and a transmitter that, in response to the number of consecutive discontinuous indications being greater than the predetermined threshold, provides a radio link failure indication.

In certain embodiments, the processor provides an indication that there is no data available for a transmission to a destination user equipment.

In some embodiments, the indication is provided in response to buffers corresponding to the destination user equipment being empty.

In various embodiments, the indication is transmitted from a medium access control layer to a physical layer, and the indication is separate from other data.

In one embodiment, the indication is transmitted to a physical layer together with a last protocol data unit for the destination user equipment.

In certain embodiments, the transmitter, in response to the indication, retransmits a last transmitted data packet to the destination user equipment for a predetermined duration or until data becomes available for transmission to the destination user equipment.

In some embodiments, the predetermined duration is set by a radio link monitoring timer.

In various embodiments, the predetermined duration is restarted in response to receiving feedback from the destination user equipment, and the feedback corresponds to the retransmission of the last transmitted data packet.

In one embodiment, a time between retransmissions of the last transmitted data packet increases after each retransmission.

In certain embodiments, a first number of retransmissions are made with a first periodicity and a second number of retransmissions are made with a second periodicity greater than the first periodicity.

In some embodiments, the destination user equipment is identified using a layer 2 destination identifier, an application layer identifier, a link identifier, or some combination thereof.

In various embodiments, providing the radio link failure indication comprises a physical layer transmitting an out of sync indication to an upper layer, and the upper layer comprises a radio resource control layer or a medium access control layer.

In one embodiment, the upper layer counts a number of out of sync indications received, and determines to provide the radio link failure indication in response to the number reaching a predetermined out of sync threshold.

In certain embodiments, the upper layer starts a timer in response to receiving a first out of sync indication, and the upper layer resets the number in response to the timer expiring before the number reaches the predetermined out of sync threshold or in response to receiving an in sync indication.

In some embodiments, the processor provides a padding medium access control transport block from a medium access control layer to a physical layer for transmission if there is no data available for transmission.

In various embodiments, the padding medium access control transport block is provided to the physical layer at a time interval that increases after each transmission.

In one embodiment, the padding medium access control transport block is configured with a specific priority, a small transport block size, a particular modulation and coding scheme, or some combination thereof.

In certain embodiments, the processor provides an informational medium access control transport block from a medium access control layer to a physical layer for transmission if there is no data available for transmission.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a first user equipment (UE), the method comprising:
    receiving an indication of a threshold number of consecutive discontinuous indications;
    counting a number of a plurality of consecutive discontinuous indications in feedback reception occasions with a second UE by incrementing a counter in response to each consecutive discontinuous indication of the plurality of consecutive discontinuous indications, wherein each discontinuous indication of the plurality of consecutive discontinuous indications comprises an absence of feedback reception at an occasion in which feedback is scheduled;
    comparing a value of the counter to the threshold number of consecutive discontinuous indications; and solely in response to the value of the counter being equal to the threshold number of consecutive discontinuous indications, providing a radio link failure (RLF) indication to an upper layer of the first UE.

2. The method of claim 1, further comprising providing a data availability indication indicating that there is no new data available for a transmission to the second UE.

3. The method of claim 2, wherein the data availability indication is provided in response to buffers corresponding to the second UE being empty.

4. The method of claim 2, wherein the data availability indication is transmitted from a medium access control (MAC) layer to a physical layer, and the data availability indication is separate from other data.

5. The method of claim 2, wherein the data availability indication is transmitted to a physical layer together with a last protocol data unit (PDU) for the second UE.

6. The method of claim 2, further comprising, in response to the data availability indication, retransmitting a last transmitted data packet to the second UE for a duration or until data becomes available for transmission to the second UE.

7. The method of claim 6, wherein the duration is set by a radio link monitoring timer.

8. The method of claim 6, wherein the duration is restarted in response to receiving feedback from the second UE, and the feedback corresponds to retransmission of the last transmitted data packet.

9. The method of claim 6, wherein a time between retransmissions of the last transmitted data packet increases after each retransmission.

10. The method of claim 6, wherein a first number of retransmissions are made with a first periodicity and a second number of retransmissions are made with a second periodicity greater than the first periodicity.

11. The method of claim 2, wherein the second UE is identified using a layer 2 destination identifier, an application layer identifier, a link identifier, or a combination thereof.

12. The method of claim 1, wherein providing the RLF indication comprises a physical layer transmitting an out of sync indication to an upper layer, and the upper layer comprises a radio resource control (RRC) layer or a medium access control (MAC) layer.

13. The method of claim 12, wherein the upper layer counts a number of out of sync indications received, and determines to provide the RLF indication in response to the number reaching an out of sync threshold.

14. The method of claim 13, wherein the upper layer starts a timer in response to receiving a first out of sync indication, and the upper layer resets the number in response to the timer expiring before the number reaches an out of sync threshold or in response to receiving an in sync indication.

15. The method of claim 1, further comprising providing a padding medium access control (MAC) transport block (TB) from a MAC layer to a physical layer for transmission if there is no data available for transmission.

16. The method of claim 15, wherein the padding MAC TB is provided to the physical layer at a time interval that increases after each transmission.

17. The method of claim 15, wherein the padding MAC TB is configured with a specific priority, a small transport block size, a particular modulation and coding scheme, or a combination thereof.

18. The method of claim 1, further comprising providing an informational medium access control (MAC) transport block (TB) from a MAC layer to a physical layer for transmission if there is no data available for transmission.

19. A first user equipment (UE), comprising:
at least one memory; and
at least one processor coupled with the at least one memory and configured to cause the first UE to:
receive an indication of a threshold number of consecutive discontinuous indications;
count a number of a plurality of consecutive discontinuous indications received in feedback reception occasions with a second UE by incrementing a counter in response to each consecutive discontinuous indication of the plurality of consecutive discontinuous indications, wherein each discontinuous indication of the plurality of consecutive discontinuous indications comprises an absence of feedback reception at an occasion in which feedback is scheduled;
compares a value of the counter to the threshold number of consecutive discontinuous indications; and
solely in response to the value of the counter being equal to the threshold number of consecutive discontinuous indications, provide a radio link failure (RLF) indication.

20. The first UE of claim 19, wherein the at least one processor is configured to cause the first UE to provide a data availability indication that there is no new data available for a transmission to the second UE.

* * * * *